United States Patent [19]

Ho

[11] Patent Number: 4,586,248
[45] Date of Patent: May 6, 1986

[54] SAFETY DEVICE FOR ARBOR OF FASTENING MACHINE

[76] Inventor: Kwang-Liang Ho, 27, Nan Yang Road, Feng Yuan, Taichung Hsien, Taiwan, 420

[21] Appl. No.: 652,514

[22] Filed: Sep. 20, 1984

[51] Int. Cl.$^4$ ............................................. B23Q 11/00
[52] U.S. Cl. ........................................ 29/708; 83/543; 192/134; 192/150
[58] Field of Search ............: 29/33 R, 708; 72/1, 72/2, 444; 192/150, 130, 134; 83/582, 616, 543, DIG. 1

[56] References Cited

U.S. PATENT DOCUMENTS

| | | | |
|---|---|---|---|
| 1,684,296 | 9/1928 | Brodsky | 192/134 |
| 2,259,257 | 10/1941 | MacBlane | 192/134 |
| 2,578,546 | 12/1951 | Honener | 192/150 |
| 2,856,999 | 10/1958 | Wilhelm | 192/150 |
| 2,928,451 | 3/1960 | Taylor | 83/543 X |
| 4,391,358 | 7/1983 | Haeger | 29/708 |

FOREIGN PATENT DOCUMENTS 2046393 11/1980 United Kingdom ................ 192/134

Primary Examiner—William R. Briggs
Attorney, Agent, or Firm—Bacon & Thomas

[57] ABSTRACT

The present invention relates to a safety device for an upper die arbor of a fastening machine having a driving sleeve, an upper mold mandrel, a copper sleeve, and a steel sleeve. The driving sleeve has a roller in each of four holes. A flange is formed on the circumference of upper mold mandrel. Due to the positions of the rollers with respect to the flange, and the difference between inside diameters of quadrangular slots formed in the copper sleeve and steel sleeve, when the upper mold mandrel moves downward and is blocked by an undesired object, the rollers pass over the flange and do not exert the normal forming force on the upper mold mandrel. Therefore, the upper mold mandrel does not exert the mechanical crushing force in order to prevent injury to the object.

5 Claims, 14 Drawing Figures

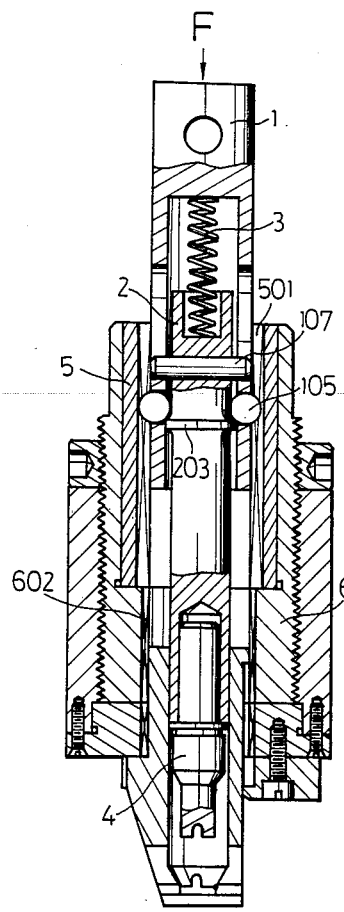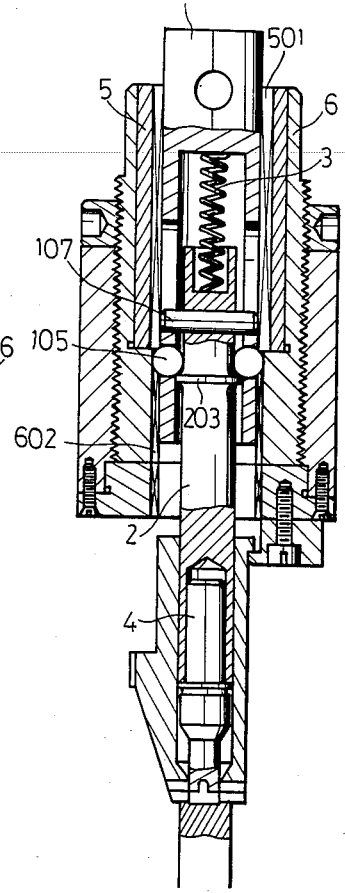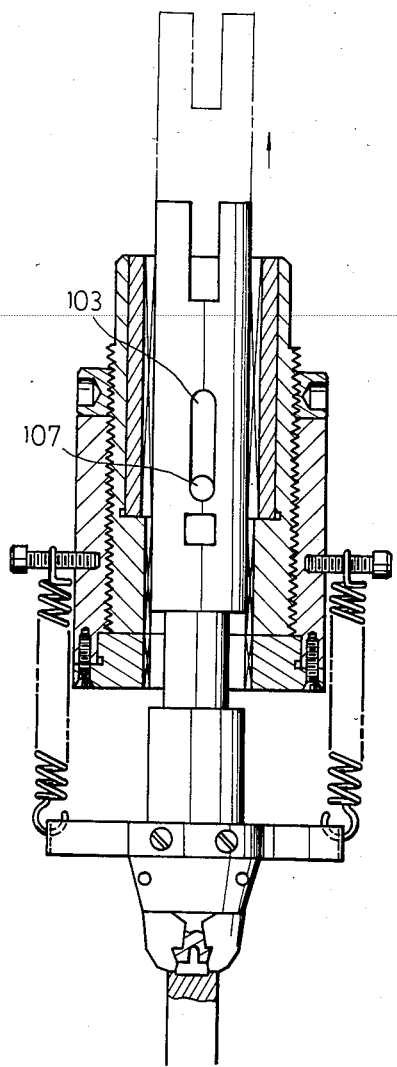

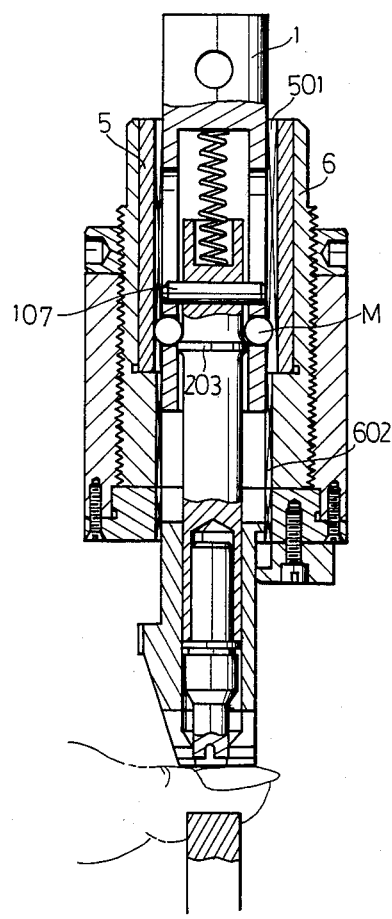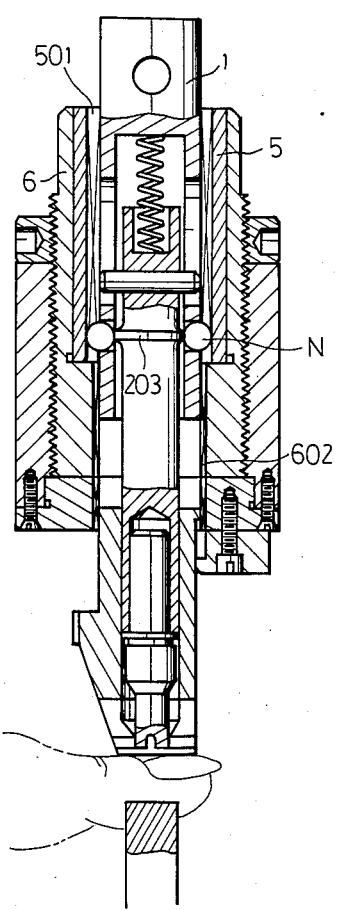

FIG.-13
FIG.-14
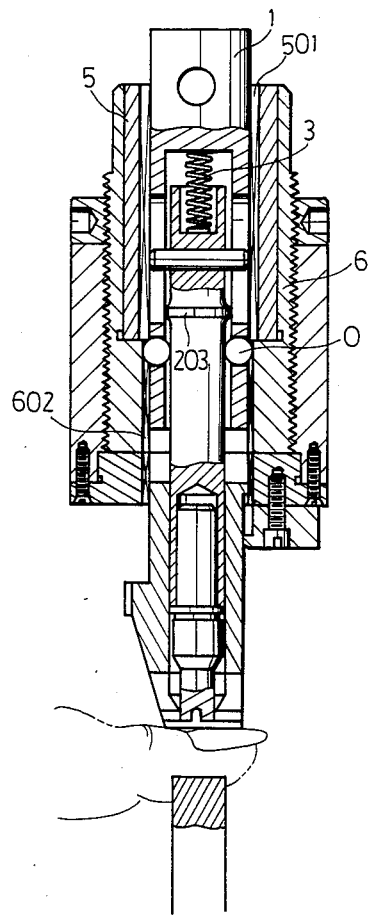
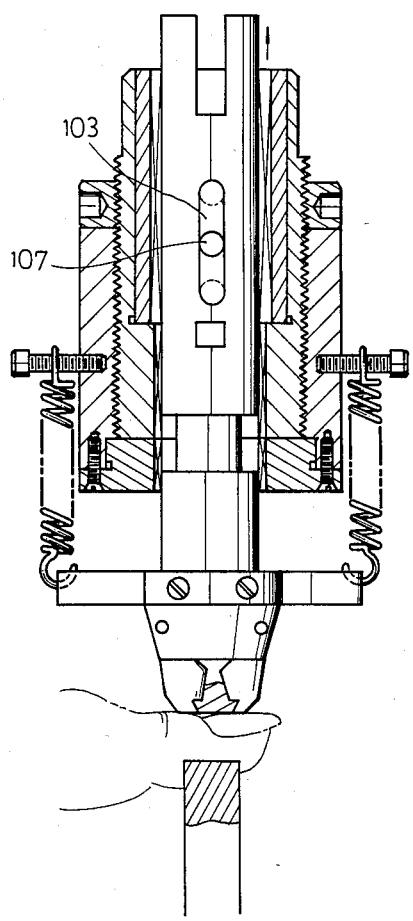

SAFETY DEVICE FOR ARBOR OF FASTENING MACHINE

BACKGROUND OF THE INVENTION

The present invention relates to a safety device for an arbor of a fastening machine. The safety device can prevent operator's finger from being hurt when it is misplaced on the pressing and fastening place. The device prevents the upper mold of said fastening machine from applying a force which will crush the finger.

In the conventional mechanical tool for fastening snaps or rivets, an upper mold applies a very strong crushing force on the lower mold. But, as is known, the fastening work is a very simple and boring work, and the operator may be injured if he is careless. Although, at the present, the feed of female and male snaps to the fastening machine is directly conveyed to the pressed position, sometimes the operator must manually adjust the skew of the female or male snap. Even though the operator is very careful when operating the machine, there is a substantial risk of injury to his finger or hand.

SUMMARY OF THE INVENTION

The main purpose of the present invention is to provide a safety device for the arbor of a fastening machine, such that when the upper mold touches the finger of an operator, it will stop the action of moving downward. A driving sleeve which is sleeved outside the upper mold continuously moves downwardly to the position of the lower dead center to complete the press stroke. However, since the upper mold is not rigidly fixed to the driving sleeve, the driving sleeve still moves downwardly to the lower dead center, but the upper mold is blocked by the finger, and it does not apply strong crushing force on the finger to thereby prevent injurty.

BRIEF DESCRIPTION OF THE DRAWING

FIG. 8 is a partial sectional view of the present invention at the upper dead center position.

FIG. 9 is a partial sectional view of the present invention at the lower dead center position.

FIG. 10 is a partial sectional view of the present invention after fastening and returning back to the upper dead center position.

FIG. 11 is a partial sectional view showing a first position of the safety action of the present invention.

FIG. 12 is a partial sectional view of a second position of the safety action of the present invention.

FIG. 13 is a partial sectional view showing a third position of the safety action of the present position.

FIG. 14 is a partial sectional view showing the safety action of the present invention.

DETAILED DESCRIPTION OF THE PREFERRED EMBODIMENT

Figure 1:
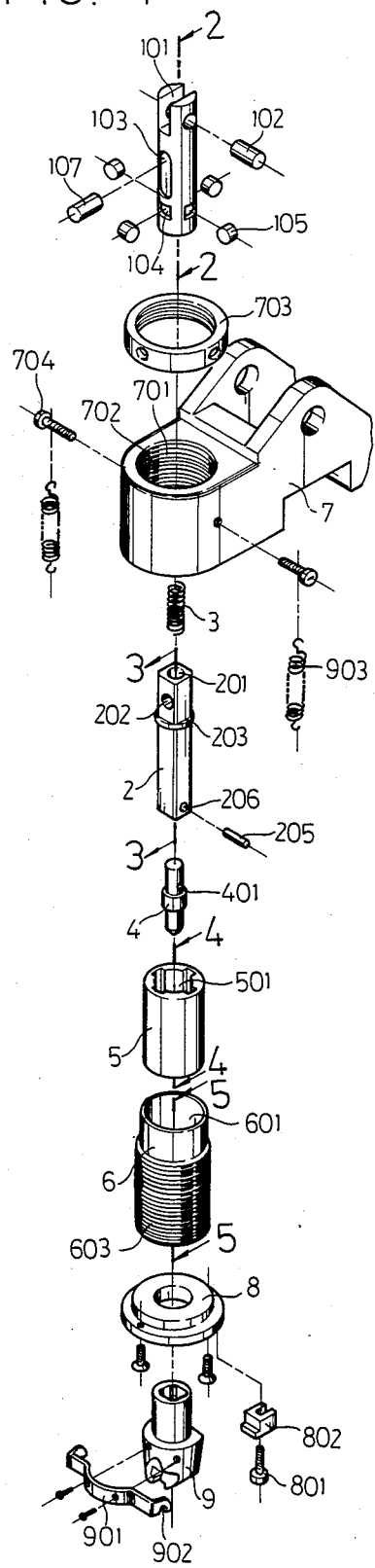
FIG. 1 is an exploded perspective view of the constitution elements of the invention.
Figure 2:
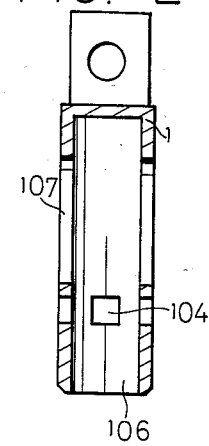
FIG. 2 is a sectional view of the driving shaft sleeve of the present invention.
Figure 3:
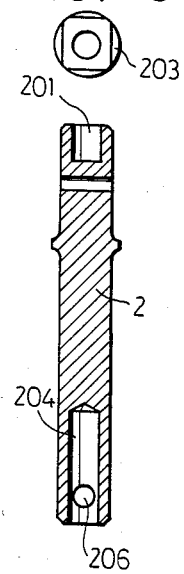
FIG. 3 is a sectional view of the upper mold mandrel of the present invention.

FIG. 1 shows an exploded, perspective view of the elements constituting the present invention which includes a driving sleeve 1 which is connected at its upper end to a rocking arm of dynamic source (not shown in figures) by a U-shaped slot 101, which can be connected to rocking arm by pin 102 and accept its dynamic power. At the middle sectional position, there is a long hole 103, and below the long hole 103 about the circumference, displaced at 90 degrees, there are formed square holes 104. Four rollers 105 are located in holes 104. The inner part of driving sleeve 1 as shown in FIG. 2 is a hollow body surrounding opening 106 for accommodating an upper mold square mandrel 2. As shown in FIG. 3, in the upper end of said upper mold square mandrel 2, there is formed a round hole 201 with proper depth, to accommodate a spring 3 in it. Below the lower margin of round hole 201, there is formed a pin hole 202. After upper mold square mandrel 2 is placed in the hollow body 106 of the driving sleeve 1, a steel pin 107 is inserted into pin hole 202 of upper mold square mandrel 2 and extends into the long hole 103 of the driving sleeve 1 to join the upper mold square mandrel 2 and the driving sleeve 1 together. A flange ring 203 is formed about the circumference of upper mold square mandrel 2. At the lower end of square mandrel 2, a hole 204 with proper depth in order to accommodate the placement of an upper mold 4, and a pin 205 is used to insert into the corresponding pin holes 206, 401 between square mandrel 2 and upper mold 4 for fixing these parts together.

Figure 4:
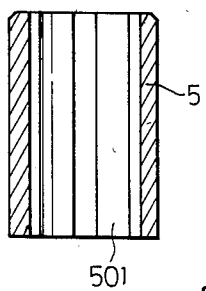
FIG. 4 is a sectional view of the copper sleeve of the present invention.
Figure 5:
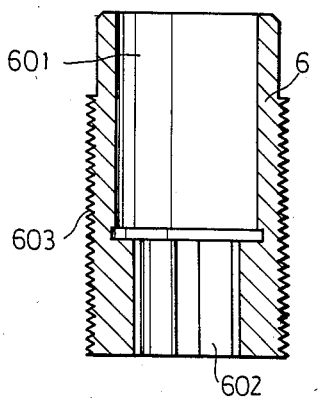
FIG. 5 is a sectional view of the steel sleeve of the present invention.

Copper sleeve 5 and steel sleeve 6 are respectively hollow cylinders, as shown in FIGS. 4 and 5. A quadrangular slot hole 501 is formed in copper sleeve 5, as shown in FIG. 4. At the inner part of the upper end of steel sleeve 6, a round hole 601 is formed with proper depth, and inside diameter to accommodate copper sleeve 5. The parts are dimensioned such that copper sleeve 5 can be just placed in the upper end round hole 601 inside steel sleeve 6. Below round hole 601, there is also formed a quadrangular slot hole 602. At its outer circumference, steel sleeve 6 has external threads 603 for screwing with inside threads 702 formed inside of through hole 701 of main body 7. When steel sleeve 6 is assembled with copper sleeve 5 and screws into main mody 7, a nut 703 can be used to fix steel sleeve 6 on the main body 7. A round plate 8 is joined the positioner 802 by screw 801 and locked at the bottom of main body 7. An upper clamping seat 9 is hooked on the end of springs 903 by hooks 902 which are locked and fixed at two arms of hook spring plate 901 at one side of upper clamping seat 9. The other ends of springs 903 are hooked upwardly to the screws 704 located at two sides of main body 7. Therefore, the upper clamping seat 9 is fixed to main body 7 by the force of springs 903.

Figure 6:
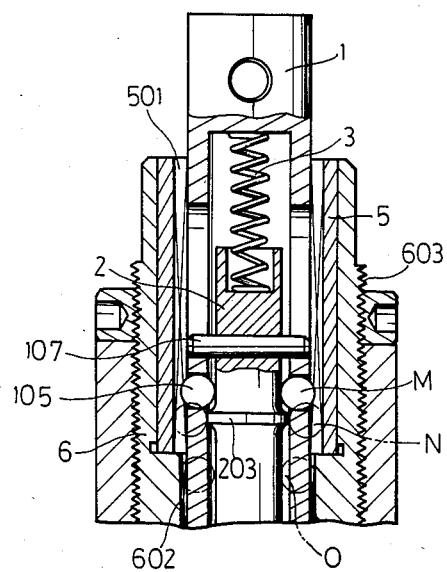
FIG. 6 is a partial sectional view of the present invention after combination.
Figure 7:
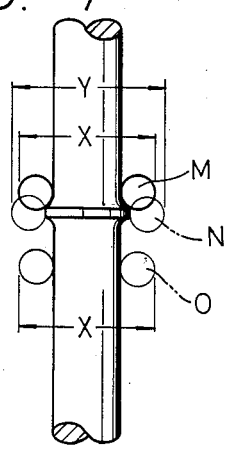
FIG. 7 is a schematic diagram of the roller and upper mold mandrel of the present invention.

FIG. 6 is a partial sectional view of the present invention after assembly. Due to the braking force of rocking arm of dynamic source (not shown in figures), driving sleeve 1, spring 3 assembled on the upper end of upper mold square mandrel 2, and upper mold square mandrel 2 will synchronously move downwardly. Rollers 105 in the square holes 104 will also move in accordance with the movement of driving sleeve 1. If upper mold square mandrel 2 cannot synchronously move downwardly in accordance with driving sleeve 1, because of certain factors, the change of the relative positions of rollers 105 and upper mold square mandrel 2 are shown in FIG. 7. When upper mold square mandrel 2 stops, and driving sleeve 1 still moves downwardly, there are three representative positions on rollers 105 and upper mold square mandrel 2, i.e., position M (shown in solid lines), position N and position O (as shown in dotted line). Position M is positioned at the upper part of flange 203 of upper mold square mandrel 2, its distance is X. Position N is just on the flange 203, and its distance is Y. Position O is at the lower part of flange 203, and its distance is also X. In FIG. 6, rollers 105 in positions M and N are located in the quadrangular slot 501, of copper sleeve 5. Distances X and Y are smaller than the inside diameter of quadrangular slot 501, therefore, rollers 105 have enough clearance to slide therein. Although rollers 105 in position O are placed in the quadrangular slot 602 of steel sleeve 6, inside diameter of quadrangular slot 602 of steel sleeve 6 is smaller than quadrangular slot 501 of copper sleeve 5, and distance X is slightly larger than said inside diameter. Therefore, rollers 105 in position O still have clearance to move in the quadrangular slot 602 of steel sleeve 6. But, the only situation in which rollers 105 will be blocked and cannot move, is when rollers 105 approach position N, and are positioned in quadrangular slot 602 of steel sleeve 6, due to distance between X and Y being slightly larger than the inside diameter of quadrangular slot 602 of steel sleeve 6. Therefore, rollers 105 insert into said place and cannot move.

FIGS. 8-10 show action of the present invention which fastens normally. As above-mentioned, upper mold square mandrel 2 of the present invention is driven by the driving sleeve 1 and moves downwardly synchronously. The transmission of acting force between both of them is effected by a spring 3, although a steel pin 107 is used to pin them together. Long hole 103 provides a buffer distance, in other words, if upper mold square mandrel 2 is stopped by the user, and only driving sleeve 1 continuously moves downwardly, steel pin 107 gradually raises up from the original position at the lower part of long hole 103 in the upper dead center position. If upper mold square mandrel 2 will not accept the downward force of driving sleeve 1 and synchronously move downwardly, it indicates the situation that upper mold square mandrel is stopped by certain factors, because of the relationship of pinning steel pin 107 and driving sleeve 1. The buffer distance of long hole 3 is called as safe distance, during which the only force acting on square mandrel 2 is the compressive force of spring 3, and not a mechanical crushing force.

FIG. 8 shows the position of upper dead center in the fastening procedure (it does not fasten yet). FIG. 9 shows the position of lower dead center when the fastening is completed. The force of dynamic source (not shown) on the driving sleeve 1 moves it downward from upper dead center and smoothly reaches the lower dead center in FIG. 9. Since it is not blocked by any external force upper mold square mandrel 2 moves in the downward stroke. At this time, the position of rollers 105 is at the flange of upper mold square mandrel 2 and in the quadrangular slot 602 of steel sleeve 6, in the same position as N in FIG. 6 such that it can insert the upper mold square mandrel 2 and not let it draw back. Therefore, upper mold 4 can interact with the lower mold and complete the action of fastening. As shown in FIG. 10, after fastening, driving sleeve 1 raises up to the upper dead center. Driving sleeve 1 is braked by the dynamic source, and after completing the press stroke, it starts to return to the upper dead center. Firstly, driving sleeve 1 releases the inserted roller 105 and continuously raises up and according to the raising up of driving sleeve 1, steel pin 107 in long hole 103 (safe slot) also pulls the upper mold square mandrel 2 back to upper dead center, and completes the operating cycle.

FIGS. 11-14 show the operation sequence when a finger is placed between upper and lower molds. In the action of the present invention as shown in FIG. 11, rollers 105 are at the upper part of flange 203 of upper mold square mandrel 2 (it is the same as position M in FIG. 6). When driving sleeve 1 moves downward, upper mold 4 touches the finger, and upper mold square mandrel will stop action of moving downward. Driving sleeve 1 will still move downward and rollers 105 are moved from original position M to position N as shown in FIG. 12. At this time, rollers 105 are at the flange 203 of upper mold square mandrel 2, but both of them are still in the quadrangular slot 501 of copper sleeve 5, and there still exists clearance. Therefore, rollers 105 can move downward according to the driving sleeve 1 to the position O of lower dead center as shown in FIG. 13. The rollers are still positioned at lower part of flange 203 of upper mold square mandrel 2, although it is in the quadrangular slot 602 of steel sleeve 6. But, as above-mentioned and according to FIG. 6, there still exists some clearance between roller 105 and quadrangular slot 602 of steel sleeve 6. Therefore, upper mold square mandrel cannot accept the mechanical force of driving sleeve 1. When driving sleeve 1 moves to lower dead center, as shown in FIG. 14, driving sleeve 1 is on the way up, which raises steel pin 107. When through steel pin 107 contacts the long hole to move it upward, it will pull upper mold square mandrel 2 back to upper dead center. Therefore, in the entire press stroke, square mandrel 2 cannot be inserted and fixed by rollers 105, therefore, it will not accept the mechanical crushing force of driving sleeve 1. It will only accept the downward acting force of spring 3 at top end of upper mold square mandrel 2 after compression, and will not seriously injure the operator's finger. The operator will be protected by the safety device of the present invention.

I claim:
1. A safety device for an arbor of a fastening machine press having upper and lower molds and a dynamic power source, comprising:
   (a) a main body;
   (b) a first, steel sleeve attached to the main body, the first sleeve defining a first quadrangular slot, having a first lateral dimensin, extending along a longitudinal axis of the first sleeve;
   (c) a second, copper sleeve defining a second quadrangular slot, having a second lateral dimension, and located such that the first and second quadrangular slots are coaxial;
   (d) a hollow drive sleeve slidably located in the quadrangular slots, the drive sleeve defining a plurality of elongated holes and a plurality of square holes evenly spaced about its circumference;
   (e) means to attach the drive sleeve to the dynamic power source such that it reciprocates in the quadrangular slot;
   (f) an upper mold mandrel having the upper mold attached to one end and extending into the hollow drive sleeve, the mandrel having an outwardly extending flange ring thereon;

(g) pin means extending transversely through the upper mold mandrel and into the plurality of elongated holes in the drive sleeve; and (h) a roller disposed in each of the square holes in the drive sleeve such that they roll within the quadrangular slot and normally bear against the flange ring to exert a forming force on the upper mold mandrel, the dimensions of the first and second quadrangular slot being such that the rollers may be displaced outwardly to pass over the flange ring without exerting a forming force on the upper mold mandrel should there be an undersired object between the upper and lower molds.

2. The safety device according to claim 1 further comprising compression spring means acting between the drive sleeve and the upper mold mandrel.

3. The safety device according to claim 1 wherein the first, steel sleeve furthr defines a round hole coaxial with the first quadrangular slot and wherein the second, copper sleeve is located within the round hole.

4. The safety device according to claim 3 wherein the second lateral dimension is greater than the first lateral dimension.

5. The safety device according to claim 3 wherein the lateral dimension between the outer surfaces of the rollers when they are on the flange ring is greater than the first lateral dimension.

* * * * *